INVENTORS:
FRANK D. QURNELL
ROBERT N. IKEMOTO
JAMES L. LASS

BY: *Samuel E. Turner*
ATTORNEY

United States Patent Office 3,741,868
Patented June 26, 1973

3,741,868
FUEL BUNDLE WITH REMOVABLE RODS
Frank D. Qurnell, Robert N. Ikemoto, and James L. Lass, San Jose, Calif., assignors to General Electric Company
Filed Mar. 30, 1970, Ser. No. 23,723
Int. Cl. G21c 3/34
U.S. Cl. 176—78
26 Claims

ABSTRACT OF THE DISCLOSURE

A removable rod arrangement for the fuel bundle of a nuclear reactor core providing ready insertion and removal of the removable rods without disassembly of the fuel bundle wherein the removable rods are accurately positioned by complementary positioning surfaces and retained in position by a spring-loaded, tapered pin and pin seat.

BACKGROUND

A nuclear reactor fuel bundle having a removable poison-containing rod is shown by J. J. Dickson in U.S. Pat. No. 3,105,026. A fuel bundle having several readily removable rods is described by J. L. Lass et al. in U.S. Pat. No. 3,349,004.

As more fully discussed in the Lass et al. patent, a fuel bundle which provides ready removal and replacement of a number of the rods without removal of the bundle from the reactor core or disassembly of the fuel bundle can serve a variety of purposes such as adding or removing burnable poison, adjusting the average enrichment of the fuel of the bundle, modifying the neutron flux pattern, providing means for irradiating samples of special material and the like.

The arrangement of Pat. No. 3,105,026 uses a threaded tubular fitting while the arrangement of Pat. No. 3,349,-004 employs a slotted tubular fitting and pin arrangement for retaining the removable rod. Such arrangements suffer several disadvantages including the addition of parasitic neutron absorption material to the fuel bundle and a limitation on the number and/or positions of the removable rods, for example, the material added to the upper tie plate by the relatively large fittings add restriction to coolant flow through the upper tie plate. Also, the prior retainer arrangements may tend to "freeze" in place, during service in the reactor core, due to corrosion or crud accumulation, thus making difficult the removal of the rod.

SUMMARY

An object of the invention is to provide a removable rod arrangement which accurately positions the removable rods, which minimizes the amount of structural material added to the fuel bundle and which provides ready removal of the removable rods even after long service in the reactor core.

These and other objects are achieved by a removable rod fitted with a spring-loaded sleeve having a retainer pin extending therefrom adapted to engage a recessed pin seat formed in the upper tie plate of the fuel bundle, the projecting part of the retainer pin being formed with an outer head portion of enlarged diameter relative to the projecting portion of the pin adjacent to the sleeve. The sleeve is formed with a rod-positioning surface adapted to abut a complementary rod-positioned surface formed in the upper tie plate adjacent the pin seat. The pin head and the recessed portion of pin seat are tapered to provide a force urging the rod-positioning surfaces into contact. Advantageously, the angle of taper of the seat is less than the angle of taper of the pin head. This provides a line contact between the pin head and seat which is easily broken, despite the presence of deposits or corrosion, during removal of the rod.

To accommodate the removable rod, the upper tie plate of the fuel bundle is modified by omitting the normal rod retaining fitting or receptacle in the desired rod position to provide a passage for the removable rod and the pin seat and positioning surface are provided in a shoulder formed on an adjacent fitting or in a bar added to the peripheral portion of the tie plate.

DRAWING

The invention is described in greater detail hereinafter with reference to the drawing wherein.

DESCRIPTION

Figure 1:
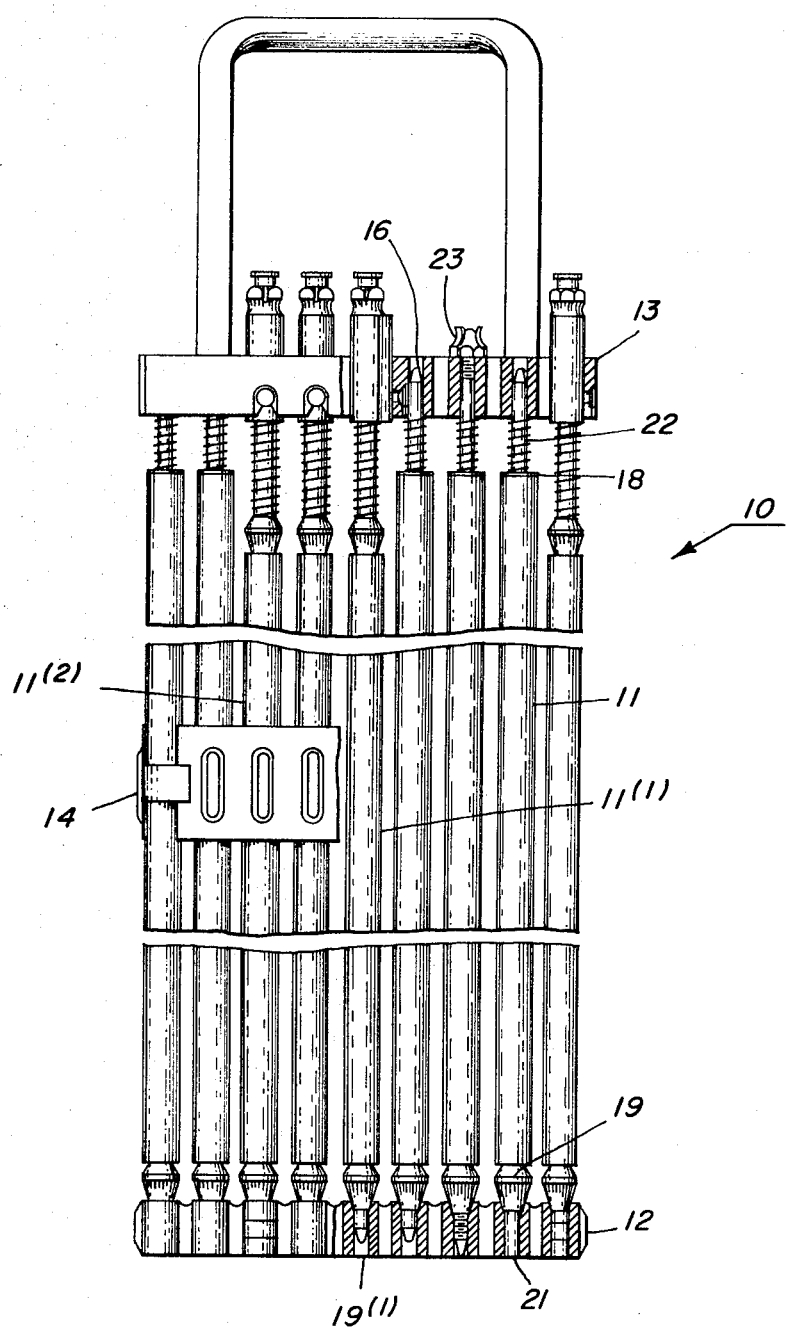
FIG. 1 is an elevation view, partly in section, of a fuel bundle.
Figure 2:
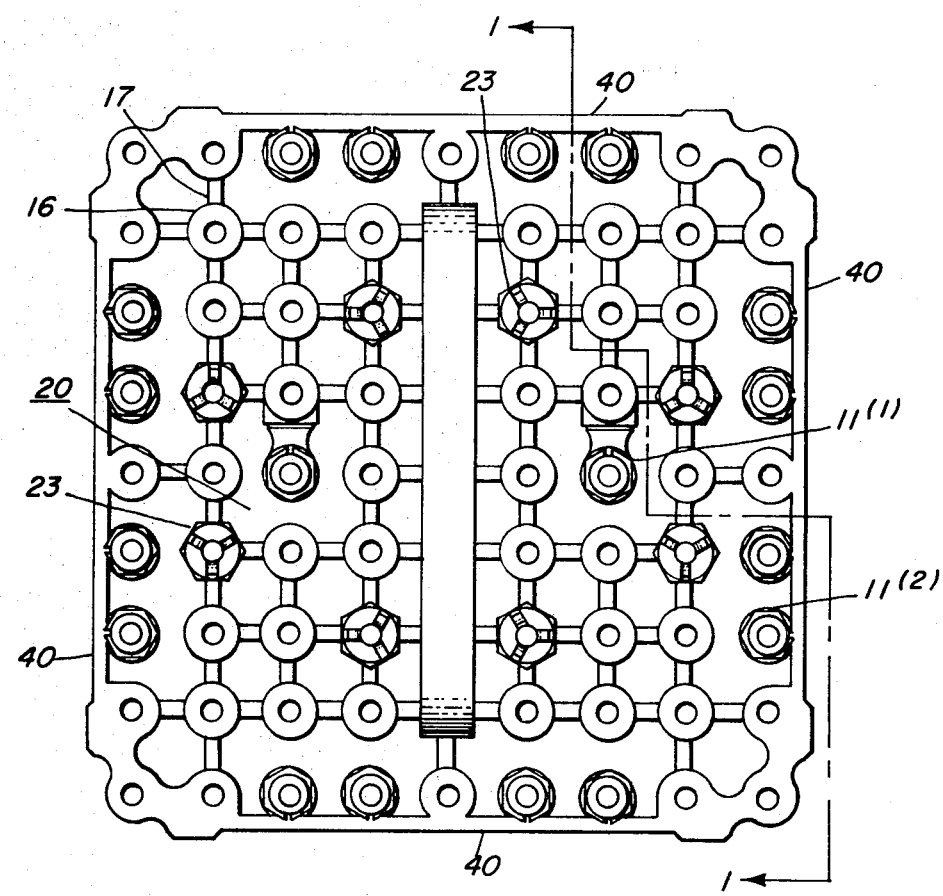
FIG. 2 is a plan view of the fuel bundle of FIG. 1.

A fuel bundle or assembly 10 is illustrated by the elevation view of FIG. 1 and the plan view of FIG. 2. The fuel bundle comprises a plurality of fuel rods 11 supported between a lower tie plate 12 and an upper tie plate 13. Spacers 14 provide intermediate lateral support. The tie plates are skeletonized to allow passage of coolant fluid therethrough; for example, upper tie plate 13 is formed of an array of rod retaining fittings or receptacles 16 interconnected by webs 17.

The fuel rods 11 comprise an elongated tube containing the fissile fuel, in the form of pellets, particles, powder or the like, sealed in the tube by upper and lower end plugs 18 and 19. Lower end plugs 19 are formed with a taper for registration and support in receptacles 21 in the lower tie plate 12 while upper end plugs 18 are formed with extensions 22 which fit into the receptacles 16 of the upper tie plate 13.

Several of the receptacles 21 in the lower tie plate 12 are formed with threads to receive rods having threaded lower end plugs. The extensions 22 of the upper end plugs of these same rods are elongated to pass through the receptacle in the upper tie plate 13 and are formed with threads to receive internally threaded retaining nuts 23. In this manner the upper and lower tie plates and the fuel rods are formed into a unitary structure.

The fuel bundle 10 is modified from the normal fuel bundle to accommodate one or more removable rods 11(1) in the interior fuel rod positions and/or one or more removable rods 11(2) in the peripheral fuel rod positions.

Figure 3:
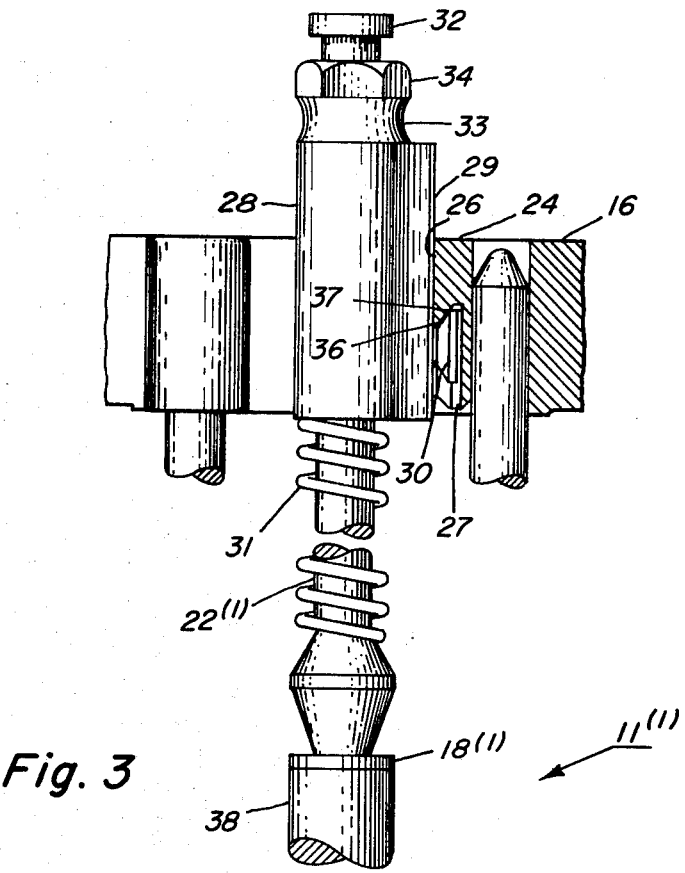
FIGS. 3 and 4 are side and plan detail views, respectively, of the removable rod retaining arrangement formed in a shoulder of a rod receptacle adjacent the removable rod passage.
Figure 4:
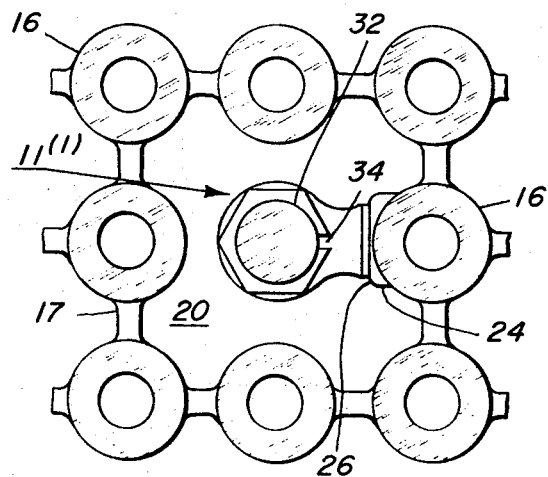

In an interior position where it is desirable to accommodate a removable rod 11(1), the usual receptacle 16 of the upper tie plate 13 is omitted to provide a passage 20 for the rod 11(1) and a shoulder 24 with a rod positioning surface 26 and a pin seat 27 is formed on an adjacent receptacle 16. Details of this arrangement are best shown in FIGS. 3 and 4.

An extension 22(1) of the upper end plug 18(1) of the removable rod 11(1) is fitted with a slidable sleeve 28 formed with a rod positioning surface 29 abutting the rod positioning surface of the shoulder 24. Fixed to the sleeve 28 is a headed retainer pin 30 adapted to engage the pin seat 27. The sleeve 28 is spring-loaded by a coil spring 31 between the sleeve 28 and the upper end plug 18(1). At its extreme end, the extension 22(1) is fitted with a stop 32 to retain the sleeve on the extension when the pin 30 is removed from the pin seat 27. The top portion of the sleeve 28 is formed with an insertion-and-removal tool engaging portion 33 including an orientation slot 34 bearing a predetermined angular relation to the retainer pin 30 so that the rod 11(1) can remotely be inserted and removed. The retainer pin 30 and the pin seat 27 are formed with tapered surfaces 36 and 37, respectively, to provide a component of the force of spring 31 in a direction to urge the rod positioning surfaces 26 and 29 together. Advantageously, the angle of the taper 37 of the pin seat 27 is slightly less than the angle of the taper 36 of the retainer pin 30 to provide a line contact between the pin and seat. This is an aid to disengagement of the pin from the seat after long service in the reactor core in the event of build-up of corrosion deposits.

The removable rod 11(1) further includes a hollow body portion 38 which may contain fuel material, neutron absorber or poisons, inert or diluent material and mixtures thereof or the like.

The removable rod 11(1) may be inserted in the bundle 10 as follows: the rod 11(1) is inserted through the passage 20 and its lower end plug 19(1), FIG. 1, inserted into the corresponding receptacle 21 of the lower tie plate 12. The spring 31 is compressed by moving the sleeve 28 toward the body portion 38 until the retainer pin 30 is below the shoulder 24. The rod 11(1) is then moved toward the shoulder 24 to place the rod positioning surfaces 26 and 29 in contact with the pin 30 below the open end of the pin seat 27. The sleeve 28 is then allowed to move upward under the force of spring 31 as the retainer pin 30 enters and engages the pin seat 27.

The arrangement of FIGS. 3 and 4, described above, may be used to provide a removable rod in any of the fuel rod positions of the fuel bundles; however, where a relatively large number of removable rods are desired in the peripheral rod position it is advantageous to employ peripheral bars 40 to provide rod position surfaces and retainer pin seats for the removable peripheral rods 11(2). To provide passage for the removable rods 11(2), the receptacles 16 of the rod positions to be occupied by the removable rods are omitted and the peripheral bars 40 are fixed to the corner and/or any remaining peripheral receptacles 16.

Figure 5:
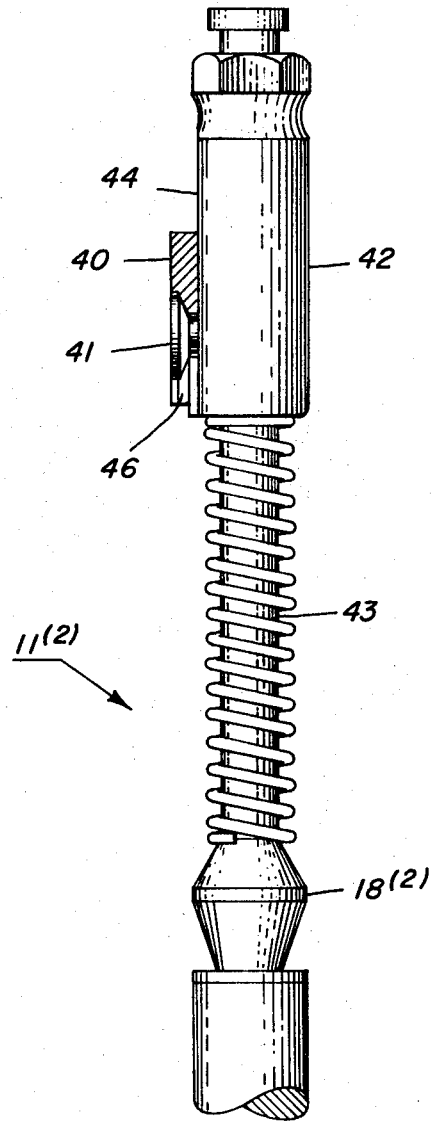
FIGS. 5 and 6 are side and front detail views, respectively, of the removable rod retaining arrangement formed in a peripheral bar of the upper tie plate of the fuel bundle.
Figure 6:
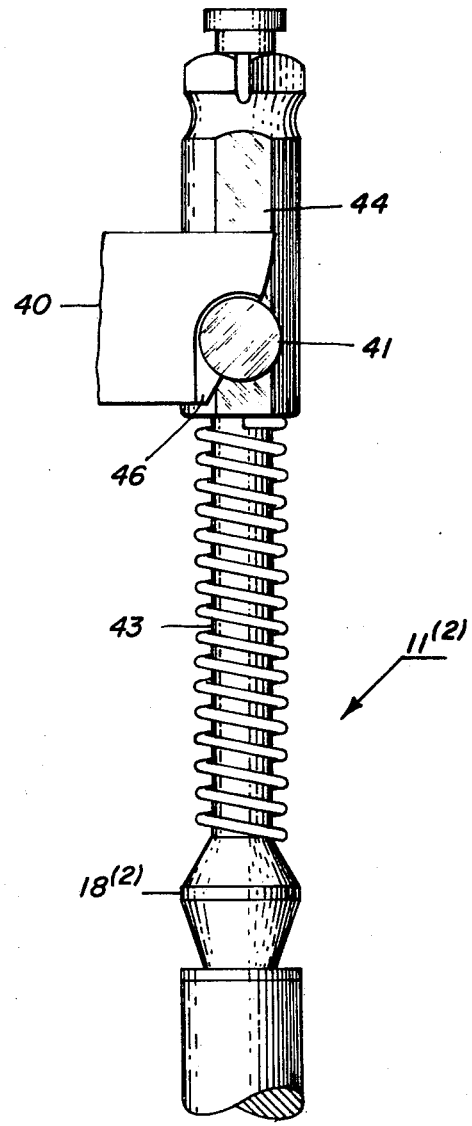

Details of this peripheral removable rod arrangement are illustrated in FIGS. 5 and 6 wherein a headed retainer pin 41 is fixed to a spring-loaded slidable sleeve 42 fitted to an extension 43 of the upper end plug 18(2) of the removable rod 11(2). The sleeve 42 is formed with a flat rod positioning surface 44 abutting the flat side of the bar 40. The bar 40 is formed with an open ended pin seat 46 adapted to engage the retainer pin 41. Other details are similar to those described in connection with FIGS. 3 and 4 including the provision of tapered engaging surfaces of the retainer pin 41 and pin seat 46.

Thus what has been described is a removable rod arrangement which accurately positions the removable rods, which minimizes the amount of material added to the fuel bundle to minimize parasitic neutron absorption and coolant flow restriction and which provides ready insertion and removal of the removable rods.

What is claimed is:

1. A fuel bundle for use in a nuclear reactor comprising: a plurality of rods, each rod containing material selected from the group consisting of (1) fuel material, (2) neutron absorber material, (3) fuel and diluent material, (4) neutron absorber and diluent material, and (5) fuel, neutron absorber and diluent material, said rods being retained in a predetermined geometric array between a first tie plate at one end of said rods and a second tie plate at the other end of said rods, at least one of said rods being removable from said bundle without disassembly of said bundle, said removable rod being fitted with a sleeve having a headed retainer pin extending substantially laterally therefrom said pin being formed with a projecting portion of predetermined diameter adjacent said sleeve and an outer head portion of larger diameter; a passage through said first tie plate for said removable rod; a pin seat in said first tie plate adjacent said passage for receiving said retainer pin, said seat having a complementary recessed portion for engaging said head portion of said pin for retaining said pin in engagement with said pin seat and substantially preventing lateral movement of said removable rod.

2. The fuel bundle of claim 1 including resilient means urging said sleeve in a direction to urge said retainer pin into said pin seat.

3. The fuel bundle of claim 1 wherein said head portion of said retainer pin is tapered in the direction of said removable rod.

4. The fuel bundle of claim 3 wherein said recessed portion of said pin seat is tapered in the direction of said removable rod.

5. The fuel bundle of claim 4 wherein the taper of said recessed portion of said seat is less than the taper of said head portion of said pin.

6. The fuel bundle of claim 2 wherein said sleeve is formed with a rod positioning surface and wherein said retainer pin extends from said surface.

7. The fuel bundle of claim 6 wherein said pin seat is formed with a complementary rod positioning surface abutting said rod positioning surface of said sleeve.

8. The fuel bundle of claim 7 wherein said head portion of said retainer pin is tapered in the direction of said rod positioning surface of said sleeve.

9. The fuel bundle of claim 8 wherein said recessed portion of said seat is tapered in the direction of said rod positioning surface of said seat.

10. The fuel bundle of claim 9 wherein the angle of taper of said seat is less than the angle of taper of said head portion of said pin whereby the resilient engagement of said head portion with said seat urges said complementary rod positioning surfaces together.

11. A fuel bundle for use in a nuclear reactor comprising: a plurality of rods, each rod containing material selected from the group consisting of (1) fuel material, (2) neutron absorber material, (3) fuel and diluent material, (4) neutron absorber and diluent material, and (5) fuel, neutron absorber and diluent material, said rods being retained in a predetermined geometric array of fuel rod positions between a first tie plate at one end of said rods and a second tie plate at the other end of said rods, at least one of said rods being removable from said bundle without disassembly of said bundle, said removable rod being fitted with a sleeve having a headed retainer pin extending substantially laterally therefrom, said pin being formed with a projecting portion of predetermined diameter adjacent said sleeve and an outer head portion of larger diameter; said first tie plate being formed of a substantially regular array of rod retaining receptacles interconnected by webs; a passage for said removable rod formed in said first tie plate in a fuel rod position which is free of a rod retaining receptacle; a pin seat formed in a rod retaining receptacle adjacent said passage for receiving said retainer pin, said seat having a recessed portion engaging said outer head portion of said pin for retaining said pin in engagement with said seat, and substantially preventing lateral movement of said removable rod.

12. The fuel bundle of claim 11 including resilient means urging said sleeve in a direction to urge said retainer pin into said pin seat.

13. The fuel bundle of claim 12 wherein said sleeve is formed with a rod positioning surface and wherein said retainer pin extends from said surface.

14. The fuel bundle of claim 13 wherein said pin seat is formed with a complementary rod positioning surface abutting said rod positioning surface of said sleeve.

15. The fuel bundle of claim 14 wherein said outer head portion of said retainer pin is tapered in the direction of said rod positioning surface of said sleeve.

16. The fuel bundle of claim 15 wherein said recessed portion of said seat is tapered in the direction of said rod positioning surface of said seat whereby the resilient engagement of said tapered head portion of said pin with said seat urges said complementary rod positioning surfaces together.

17. The fuel bundle of claim 16 wherein the angle of taper of said recessed portion of said seat is less than the angle of taper of said head portion of said pin.

18. A fuel bundle for use in a nuclear reactor comprising: a plurality of rods, each rod containing material selected from the group consisting of (1) fuel material, (2) neutron absorber material, (3) fuel and diluent material, (4) neutron absorber and diluent material, and (5) fuel, neutron absorber and diluent material, said rods being retained in a predetermined geometric array between a first tie plate at one end of said rods and a second tie plate at the other end of said rods, at least one of said rods being removable from said bundle without disassembly of said bundle, said removable rod being fitted with a sleeve having a headed retainer pin extending substantially laterally therefrom, said pin being formed with a projecting portion of predetermined diameter adjacent said sleeve and an outer head portion of larger diameter; said first tie plate comprising an array of rod retaining receptacles and a peripheral bar along at least one side thereof; a passage for said removable rod adjacent said peripheral bar; a pin seat in said peripheral bar adjacent said passage for receiving said retainer pin, said seat having a recessed portion engaging said head portion for retaining said retainer pin in said pin seat and substantially preventing lateral movement of said removable rod.

19. The fuel bundle of claim 18 including resilient means urging said sleeve in a direction to urge said retainer pin into said pin seat.

20. The fuel bundle of claim 19 wherein said sleeve is formed with a flat rod positioning surface and wherein said retainer pin extends from said surface.

21. The fuel bundle of claim 20 wherein said head portion of said pin and said recessed portion of said seat are tapered whereby the resilient engagement of said pin with said seat urges said rod positioning surface of said sleeve into contact with said peripheral bar.

22. The fuel bundle of claim 21 wherein the angle of taper of said recessed portion of said seat is less than the angle of taper of said head portion of said pin.

23. A rod securing means for use in a nuclear fuel bundle containing material selected from the group consisting of (1) fuel material, (2) neutron absorber material, (3) fuel and diluent material, (4) neutron absorber and diluent material, and (5) fuel, neutron absorber and diluent material, and adapted for insertion into and removal from the fuel bundle without disassembly of said fuel bundle, comprising: a hollow portion containing said material; a first end plug at one end of said portion adapted to fit a receptacle in a first tie plate of said bundle; a second end plug at the other end of said portion, said second end plug being formed with an extension; a sleeve fitted over said extension and being a sliding fit therealong; a headed retaining pin fixed to said sleeve for engaging a recessed seat in a second tie plate of said bundle for substantially preventing lateral movement of said removable rod, said pin being formed with a projecting portion of predetermined diameter adjacent said sleeve and an outer head portion of larger diameter; and resilient means urging said sleeve along said extension away from said hollow portion.

24. The rod of claim 23 wherein said head portion of said retaining pin is tapered in the direction of said sleeve.

25. The rod of claim 23 further including a stop on said extension for retaining said sleeve on said extension.

26. The rod of claim 23 wherein said sleeve is formed with a rod insertion-removal tool engaging portion including an orientation slot bearing a predetermined angular relationship to said retainer pin.

References Cited

UNITED STATES PATENTS

| | | | |
|---|---|---|---|
| 3,087,882 | 4/1963 | Martin | 176—81 X |
| 3,145,152 | 8/1964 | Morrison | 176—81 X |
| 3,133,000 | 5/1964 | Beavis | 176—81 X |
| 3,349,004 | 10/1967 | Lass et al. | 176—78 |
| 3,382,153 | 5/1968 | Bigge et al. | 176—78 X |
| 3,158,549 | 11/1964 | Fowler | 176—78 |

FOREIGN PATENTS

| | | | |
|---|---|---|---|
| 915,370 | 1/1963 | Great Britain | 172—29 |

CARL D. QUARFORTH, Primary Examiner

G. G. SOLYST, Assistant Examiner

U.S. Cl. X.R.

176—79, 86, 91